US006352133B1

(12) United States Patent
Ojima

(10) Patent No.: US 6,352,133 B1
(45) Date of Patent: Mar. 5, 2002

(54) CONSTRUCTION MACHINERY

(75) Inventor: Mitsugu Ojima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/700,995

(22) PCT Filed: Mar. 21, 1999

(86) PCT No.: PCT/JP00/02518

§ 371 Date: Nov. 22, 2000

§ 102(e) Date: Nov. 22, 2000

(87) PCT Pub. No.: WO00/65160

PCT Pub. Date: Feb. 11, 2000

(30) Foreign Application Priority Data

Apr. 21, 1999 (JP) .......................................... 11-114136

(51) Int. Cl.[7] ................................................ B60K 26/00

(52) U.S. Cl. ..................... 180/326; 180/89.13; 180/334

(58) Field of Search ............................. 180/326, 89.13, 180/321, 334

(56) References Cited

U.S. PATENT DOCUMENTS 4,478,308 A * 10/1984 Klaassen .................... 180/326
5,341,895 A * 8/1994 Grinberg et al. ............ 180/326
5,617,929 A * 4/1997 Richardson et al. ........ 180/326
5,924,515 A * 7/1999 Stauffer ...................... 180/326
6,148,688 A * 11/2000 Nishimaki ................... 74/493
6,164,285 A * 12/2000 Garberg et al. ............. 180/326

FOREIGN PATENT DOCUMENTS

| | | |
|---|---|---|
| JP | 63-179520 | 11/1988 |
| JP | 4-30032 | 2/1992 |
| JP | 4-250230 | 9/1992 |
| JP | 6-85456 | 12/1994 |
| JP | 8-284212 | 10/1996 |

* cited by examiner

*Primary Examiner*—Brian L. Johnson
*Assistant Examiner*—Deanna Draper
(74) *Attorney, Agent, or Firm*—Mattingly, Stanger & Malur, P.C.

(57) ABSTRACT

A lock mechanism (32) is constituted by a slide plate (36) with a slot (37) and a notched groove (39), and a lock pin (41) which is provided on the side of a console (24). Through the slot (37), the slide plate (36) is slidably supported on a couple of support projections (34) which are provided on the side of an operator's seat (7). By engaging the notched groove (39) with the lock pin (41), the console (24) is locked in an operating position. When an entrance gating lever (29) is manipulated by an operator, the slide plate (36) is pulled by a push-pull cable (43) to slide in a rearward direction against the action of a tension spring (42). Whereupon, the notched groove (39) is disengaged from the lock pin (41), and the console (24) is swung back into an upturned position by the action of a gas spring (28).

9 Claims, 10 Drawing Sheets

CONSTRUCTION MACHINERY

TECHNICAL FIELD

This invention relates to a construction machine which is provided with an operating lever alongside an operator's seat and which can be suitably applied, for example, to a hydraulic excavator or the like.

BACKGROUND ART

Generally, in the case of construction machines such as hydraulic excavators or the like, console devices are usually provided on right and left sides of an operator's seat, each console device having a manual operating lever, for example, for manually controlling the operation of a hydraulic excavator.

More specifically, prior art hydraulic excavators of this sort usually includes a vehicle body with an operator's seat to be occupied by an operator and an entrance opening providing an access to the operator's seat, and console devices to be operated by an operator sitting on the operator's seat. And said console device is constituted by a console including an operating lever vertically pivotally supported on the vehicle body at a lateral side of the operator's seat for manipulation by an operator, a biasing member for urging the console to swing back toward an upturned position from an operating position, an entrance gating lever provided at one side of the console and pivotally switchable to and from an entrance blocking position and an open position, and a lock mechanism provided between the vehicle body and the console to disengageably engage therewith and adapted to be switched into an unlocking position by the entrance gating lever from a locking position holding the console in the operation position (For example, Japanese Laid-Open Utility Model Publication No. H6-85456).

In this connection, for example, the console is pivotally supported at its rear portion so that its front portion can be turned up and down about the pivotally supported portion between an upturned position and an operating position. When the console is in the operation position, an operating lever is located in a fore position by the operator's seat, so that an operator of the hydraulic excavator, who is seated on the operator's seat, can manipulate the operating lever in a natural posture, for example, for driving a front working mechanism.

When an operator on the operator's seat intends to get down from the machine, the console is swung back into an upturned position as the entrance gating lever is shifted to an open position. As a result, the console is turned in an obliquely rearward direction together with the operating lever, permitting the operator to get down from the operator's seat and get off the machine through a passage which is now opened in front of the console.

Further, the entrance gating lever is linked with a safety change-over valve which functions to open and block communication between a hydraulic pump and a hydraulic circuit. When the entrance gating lever is shifted to a blocking position, the safety change-over valve is closed to suspend pressure oil supply to a vehicular drive motor and a rotating motor of the hydraulic excavator as well as pressure oil supply to hydraulic cylinders of the front working mechanism, preventing erroneous or spontaneous activation of hydraulic actuators while an operator is away from the machine (e.g. as disclosed in Japanese Laid-Open Patent Publication No. H4-30032).

In this instance, a lock mechanism is constituted by a locking lever which is pivotally supported on the side of a vehicle body through a pin member, for example, on a lower front portion of the console, and a lock pin which is provided on the side of the console and arranged to be brought into and out of engagement with the lock lever. While the hydraulic excavator is in operation, the lock lever of the lock mechanism is held in engagement with the lock pin. As a result, the console is locked in an operating position against a biasing action of a tension spring.

On the other hand, when the entrance gating lever is manipulated by an operator who is going to get down to the outside from the operator's seat, the lock lever on the side of the vehicle body is turned about the pin member and disengaged from the lock pin. As a result, the console is released from a locked state and raised into un upturned position by the biasing action of the tensile spring.

In this regard, according to the above-mentioned prior art, the lock lever of the lock mechanism is pivotally supported on the side of the vehicle body, and arranged to be brought into and out of engagement with the lock pin on the side of the console. When the entrance gating lever is shifted by an operator, the lock lever is turned out of engagement with the lock pin, permitting the console to swing back into the upturned position under the influence of the biasing action of the tension spring.

However, the above-described rotary type lock lever has a base end portion pivotally supported on the side of the vehicle body simply through a single pin member, and in that state it is brought into and out of engagement with the lock pin on the side of the console. Therefore, when vibration, impact or other external force is applied to the console device, for example, it is very likely that staggering movements occur between the lock lever and lock pin or between the vehicle body and the lock lever, resulting in generation of noises or malfunctioning of the lock mechanism.

DISCLOSURE OF THE INVENTION

In view of the above-described problems with the prior art, it is an object of the present invention to provide a construction machine with a lock mechanism which is free of staggering movements even when an external force is applied thereto and which can retain a console stably in an operating position while the construction machine is in operation.

For solving the above-mentioned problems, the present invention is directed to a construction machine which basically includes a vehicle body having an operator's seat and a entrance providing an access to the operator's seat, and a console device to be operated by an operator who is seated on the operator's seat, the console device including a console vertically swingably supported on the vehicle body in a position at one side of the operator's seat and provided with an operating lever to be manipulated by the operator, a biasing member urging the console from an operating position to an upturned rest position, an entrance gating lever pivotally supported at one side of the console and pivotally switchable to and from a blocking position and an open position, and a lock mechanism for releasably locking the console to the side of the vehicle body, the lock mechanism being arranged to be shifted to an unlocking position by the entrance gating lever, releasing the console into an unlocked state from a locking position holding the console in the operating position.

According to the present invention, there is provided a construction machine which is characterized in that the lock mechanism of the console device comprises: support projections provided on the side of the operator's seat and projected toward the console: a slide member supported by the support projections for back and forth sliding movements and provided with a notched groove at a fore end portion thereof: a locking projection provided on the side of the console and adapted to be brought into engagement with the notched groove when the slide member is shifted forward into the locking position and disengaged from the notched groove when the slide member is shifted rearward into the unlocking position: a biasing spring member provided between the vehicle body and the slide member and arranged to urge the slide member in a direction for engagement with the notched groove; and a link member connected between the entrance gating lever and the slide member and operative to slide the slide member in a rearward direction against the biasing spring in relation with manipulation of the entrance gating lever.

With the arrangements just described, when the slide member is in the locking position, the locking projection on the side of the console is held in engagement with the notched groove in the slide member by the use of the spring member, thereby locking the console in the operating position. When the entrance gating lever is shifted by an operator, the slide member is pulled by the link member to slide into the unlocking position. As a result, the locking projection is disengaged from the notched groove, releasing the console from the locked state and permitting same to swing back into the upturned position under the influence of the biasing member.

According to the present invention, the notched groove formed substantially in V-shape diverging toward its outer open end, so that the locking projection can be held in abutting engagement with opposite wall sections of the V-groove.

Further, according to the present invention, the notched groove is defined in the slide member by a substantially horizontal upper wall section, and a sloped lower wall section inclined downward in forward direction.

With the arrangements just described, at the time when the locking projection is disengaged from the notched groove by a horizontal sliding movement of the slide member and swung back into the upturned position along with the console, it can be smoothly disengaged from the notched groove along the horizontal upper wall section of the notched groove. Further, since the lower wall section is sloped downward in forward direction, the locking projection can be abutted against both the upper and lower wall sections of the notched groove.

Further, according to the present invention, the slide member is provided with a tapered surface along a fore end portion on the upper side of the notched groove for guiding the locking projection toward and into the notched groove.

With the arrangements just described, when the locking projection is swung downward toward the operating position along with the console, it is abutted on the tapered surface of the slide member and thereby guided toward and into the notched groove.

Further, according to the present invention, the slide member is provided with a slot extending substantially horizontally in a longitudinal direction thereof and in a position vertically offset from the notched groove by a predetermined distance, and the support projections are slidably received in the slot for sliding movements therealong.

With the arrangements just described, as the slide member is put in a forward or rearward sliding movement on the support projections which are slidably received in the slot, it can be smoothly moved to an stroke end substantially free of vertical staggering movements which are restricted by the support projections. In addition, since the slot and notched groove are provided in vertically offset positions, an external force which may be exerted on the slide member from or through the biasing member acts as a moment tending to hold the sliding member in abutting engagement with the support projections in a stabilized state.

Further, according to the present invention, a plural number of support projections are provided at one side of the operator's seat at intervals in horizontal direction. Accordingly, as the slide member is horizontally put in a forward or rearward sliding movement, it can be supported by a plural number of support projections and moved smoothly free of vertical staggering movements.

BEST MODE FOR CARRYING OUT THE INVENTION

Figure 1:
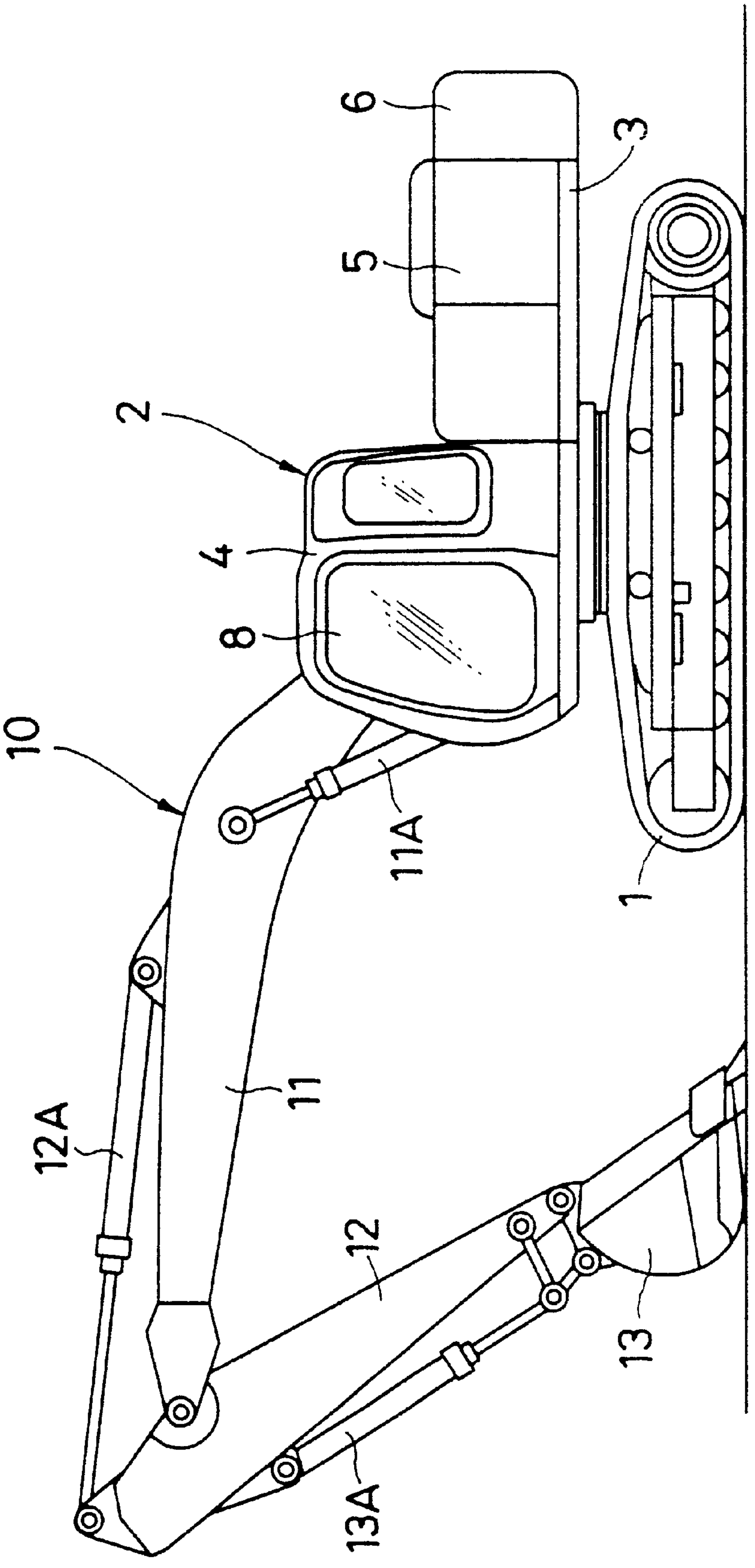
FIG. 1 is a front view of a hydraulic excavator to which the present invention is applied.

Hereafter, with reference to FIGS. 1 through 10, the present invention is described more particularly by way of a hydraulic excavator, which is one form of application of the construction machine according to the present invention.

In the drawings, indicated at 1 is a vehicular base carrier of a hydraulic excavator, and at 2 is an upper rotary body which is rotatably mounted on the base carrier 1. Provided on a rotary frame 3 of the upper rotary body 2 are a cab 4 which internally defines an operating room, a housing cover 5 of a machine room (not shown) which accommodates a prime mover, a hydraulic pump and so forth, and a counterweight 6.

Figure 2:
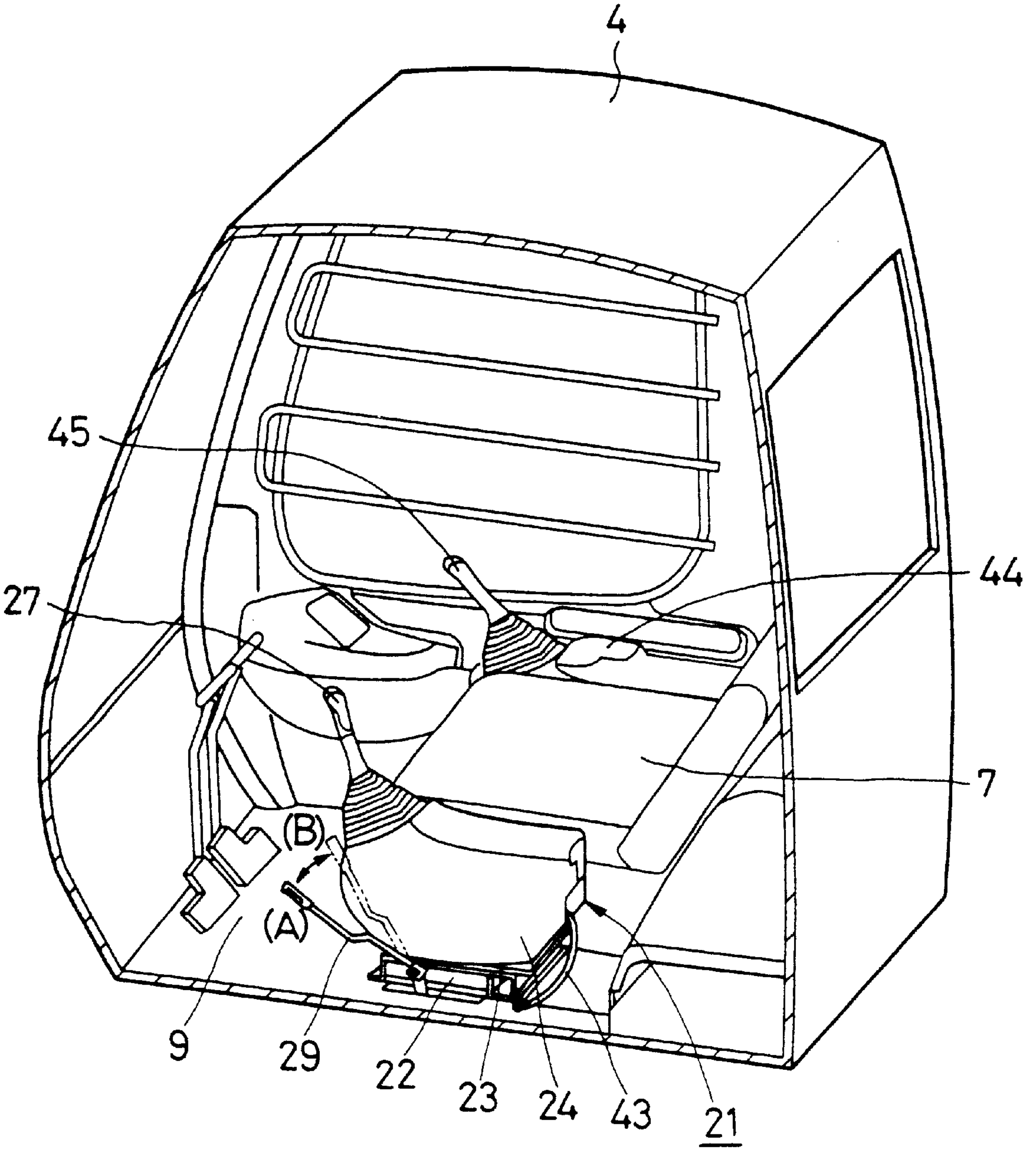
FIG. 2 is a partly cutaway perspective view on an enlarged scale of a cab portion of the hydraulic excavator.

In this instance, as shown in FIG. 2, an operator's seat 7 is provided at a center position within the cab 4. Located to the left of the operator's seat 7 or between the operator's seat and an entrance opening 8 (FIG. 1) of the cab 4 is a console device 21 which will be described hereinafter. Further, a passage 9 is provided between the operator's seat and the front end of the operating room, for an operator who is climbing up or down the machine.

Indicated at 10 is a front working mechanism which is mounted on a front section of the upper rotary body 2 for lifting loads up and down. As seen in FIG. 1, the front working mechanism 10 is largely constituted by a boom 11 which is pivotally supported on the rotary frame 3 at is base end and lifted up and down by a boom cylinder 11A, an arm 12 which is pivotally connected to the fore end of the boom 11 and swung back and forth by an arm cylinder 12A, and a bucket 13 which is pivotally connected to the fore end of the arm 12 and swung back and forth by a bucket cylinder 13A.

Pressure oil which is delivered from the hydraulic pump is fed to and from the respective hydraulic actuators, including the cylinders 11A, 12A and 13A of the front working mechanism 10, a vehicular drive motor and a rotating motor, by way of a hydraulic circuit (which is not shown). Accordingly, the hydraulic excavator can excavate earth by the use of the boom 11, arm 12 and bucket 13, can turn the upper rotary body 2, and at the same time can drive the vehicular base carrier 1.

Figure 3:
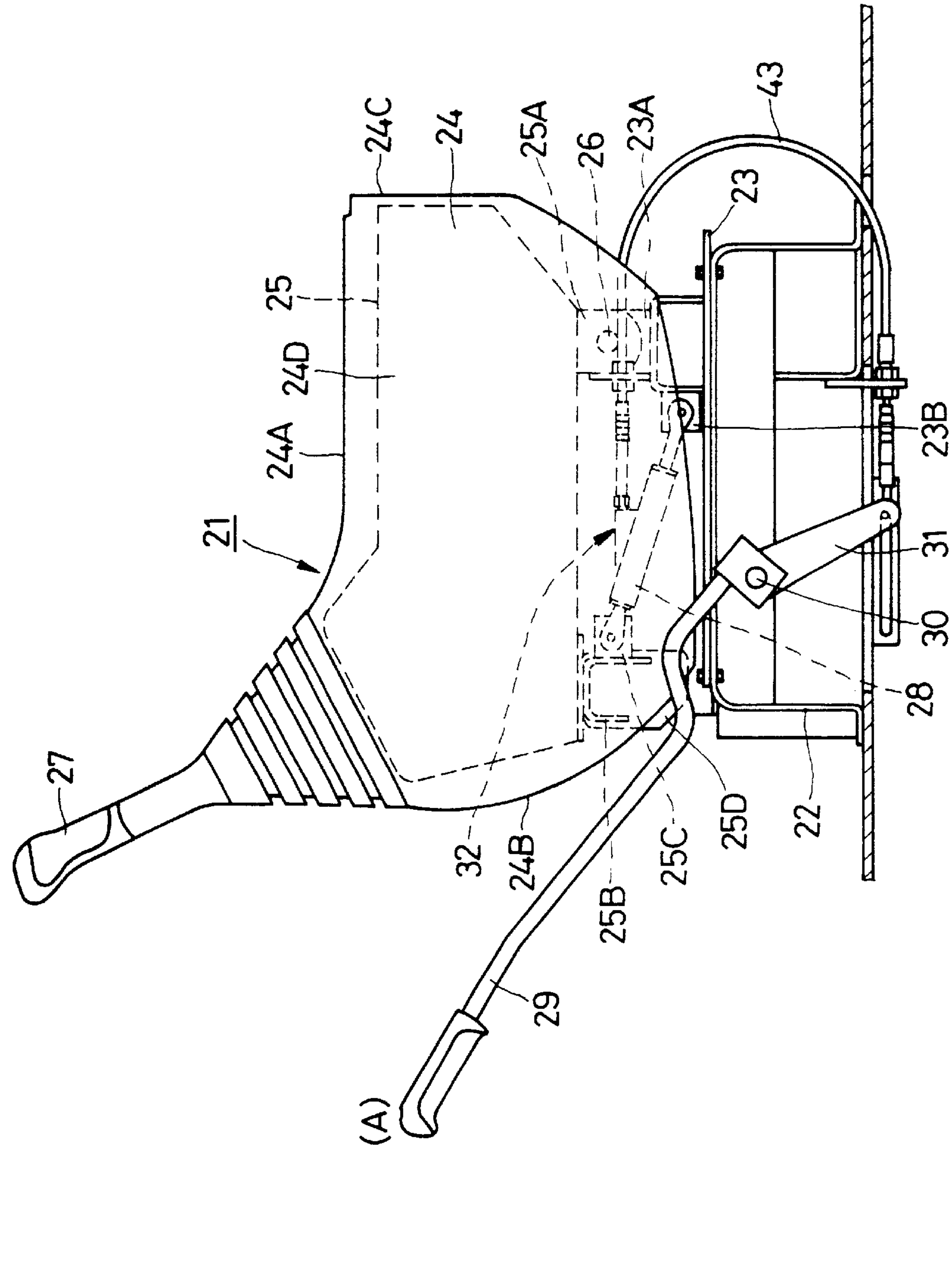
FIG. 3 is a front view of a console device embodying the present invention.

Denoted at 21 is a console device which is provided within the cab 4 on the left side of the operator's seat 7 and through a base 22. As shown in FIGS. 2 and 3, the console device 21 is constituted by console mounter 23, console 24, gas spring 28, entrance gating lever 29 and lock mechanism 32, as described in greater detail below.

Figure 8:
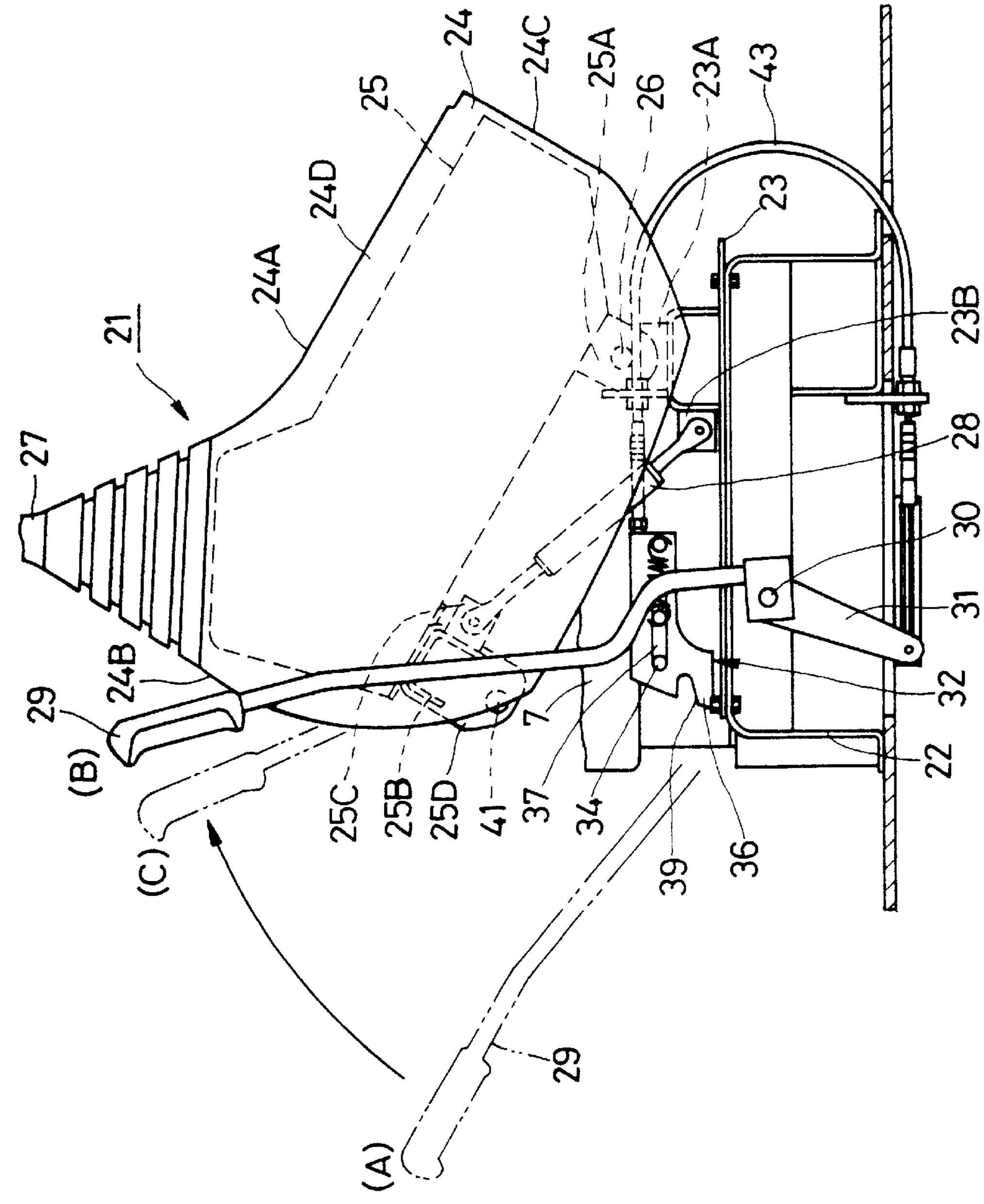
FIG. 8 is a front view of the console device which has been swung back into an upturned position by means of an entrance gating lever.

Indicated at 23 is the console mounter which is fixed to the base 22 by screws or other fixation means. For example, as shown in FIGS. 3 and 8, the console mounter 23 is formed by fixing a metallic frame member of inverted U-shape to a metal plate. Further, integrally attached to the console mounter 23 are a console support member 23A for pivotally supporting the console 24 and a gas spring support member 23B for pivotally supporting one end of the gas spring 28.

Figure 4:
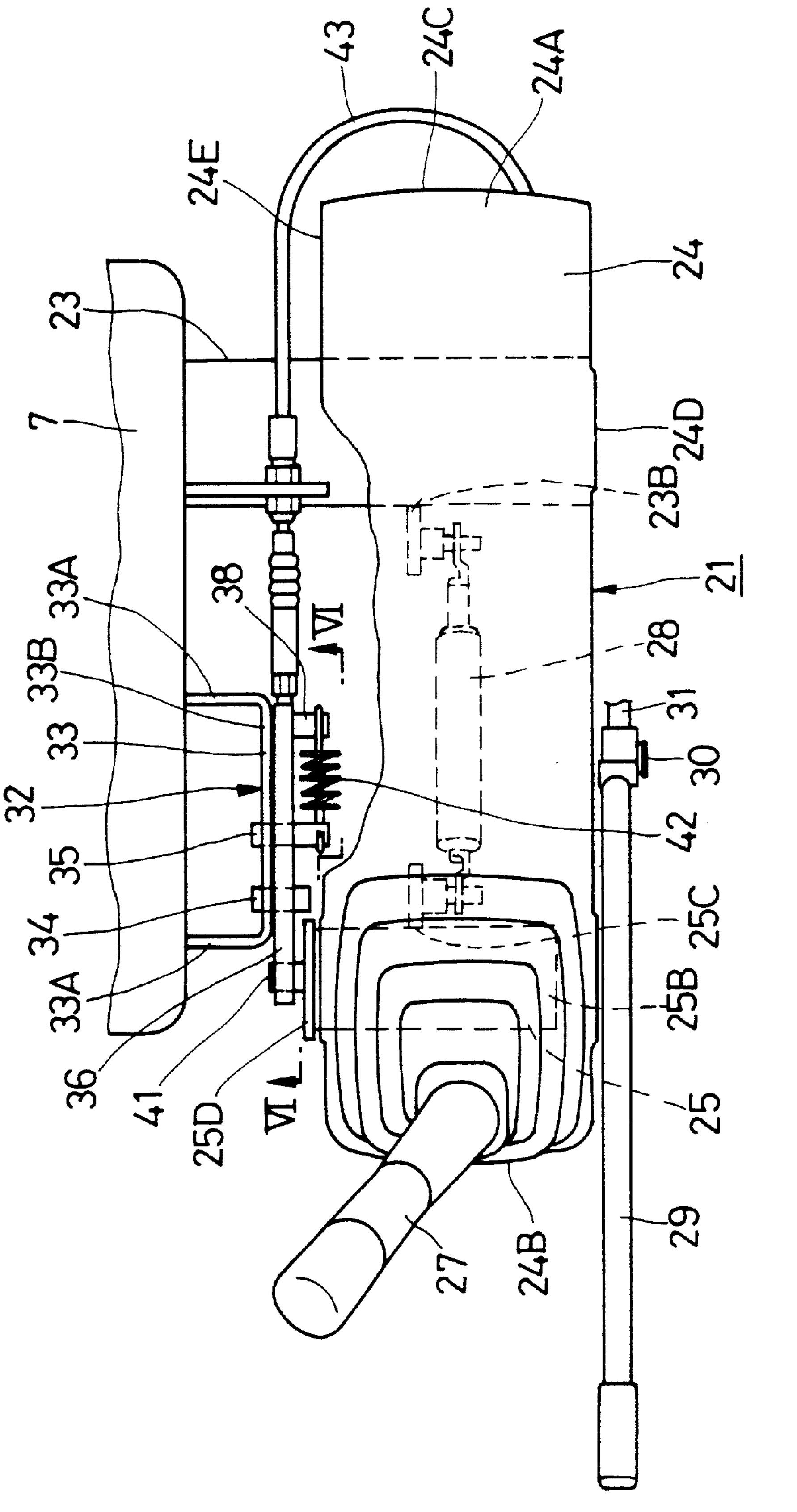
FIG. 4 is a partly cutaway plan view of the console device according to the present invention.
Figure 5:
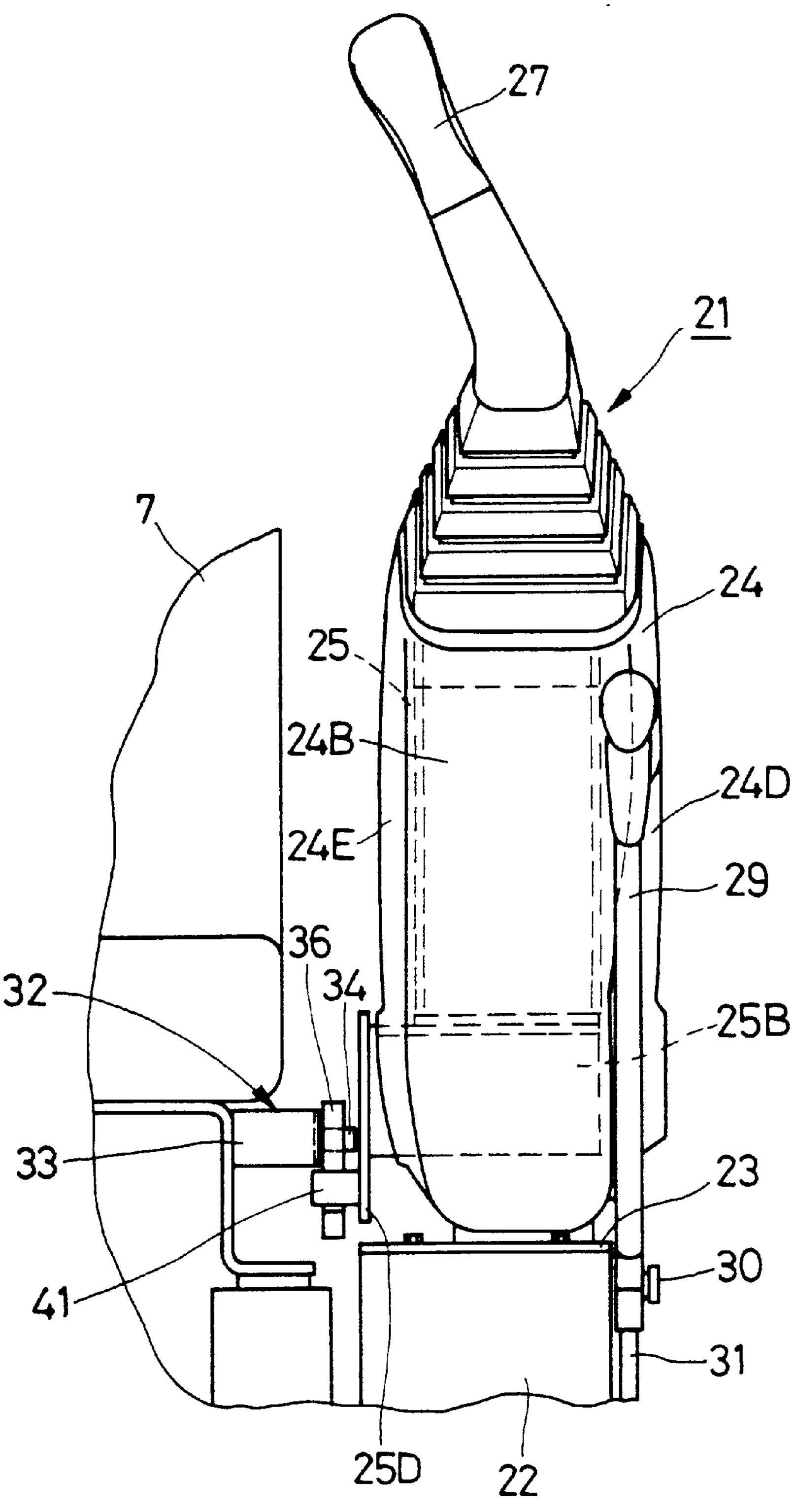
FIG. 5 is a left-hand side view of the console device according to the present invention.

Denoted at 24 is the console which is pivotally supported on the support member 23A at its rear portion so that it can be turned vertically upward or downward about the pivotally supported rear portion. As shown in FIGS. 3 to 5, the console is in the shape of a box-like frame structure 25 which is open on the lower side and which has a top panel 24A, a front panel 24B, right and left side panels 24D and 24E, for example, of metallic or synthetic resin plates, attached on the outer side thereof.

Attached to the rear side of the frame structure 25 of the console are a pair of brackets 25A (only one of which is shown in the drawing) which are pivotally connected to the console support member 23A through a connecting pin 26. Therefore, the console 24 can be turned vertically upward or downward between an operating position shown in FIG. 3 and an upturned position shown in FIG. 8. Further, as shown in FIGS. 3 and 4, securely fixed between front lower portions of the frame structure 25 is a crossbar 25B substantially of inverted U-shape in section. This crossbar 25B is provided with a projecting support member 25C, securely fixed to its rear side, for supporting the other end of the gas spring 28, along with a support plate 25D which is integrally attached to its right end to support a lock pin 41 which will be described hereinafter.

Indicated at 27 is a left operating lever which is pivotally shiftably projected upward from an upper front end portion of the console 24. As shown in FIG. 3, for example, the operating lever 27 is connected to a pilot operating valve (not shown) which controls the amount of pressure oil to be supplied to the respective hydraulic actuators except the vehicular drive motor. Accordingly, through manipulation of the operating lever 27, the front working mechanism 10 can be put in a lifting movement or the upper rotary body 2 can be rotated through a desired angle.

Designated at 28 is the gas spring which is interposed in a compressed state between the console mounter 23 and the console 24 to serve as a biasing member. As seen in FIGS. 3 and 8, one end of the gas spring 28 is pivotally connected to the support member 23B of the console support member 23, while the other end is pivotally connected to the rear projection 25C on the frame structure 25 of the console 24. By a biasing action of the gas spring 28, the console 24 is constantly urged toward an upturned position away from its operating position.

Indicated at 29 is an entrance gating lever which is pivotally connected, for example, to a side plate of the base 22 through a connecting pin 30. As shown in FIG. 3, the entrance gating lever 29 is provided with a rocking arm 31, which is extended integrally from its base end in a radially opposite direction of the connecting pin 30. The distal end of the rocking arm 31 is connected to a slide plate 36 by way of a push-pull cable 43 which will be described after. Further, through other push-pull cable and signal line (both not shown), the entrance gating lever 29 is connected, for example, to a safety or protective change-over valve of a hydraulic circuit or the like.

Furthermore, the entrance gating lever 29 can be turned integrally with the rocking arm 31 between a blocking position (A) of FIG. 3 and an open position (B) of FIG. 8. In this instance, when the entrance gating lever 29 is in the blocking position (A), the console 24 is locked in the operating position by a lock mechanism 32 which will be described hereinafter, and at the same time the safety change-over valve is held in a communicating position to supply pressure oil from the hydraulic pump to a directional control valve and hydraulic actuators.

On the contrary, when the entrance gating lever 29 is turned into the open position (B) from the blocking position (A), the console 24 is released by the push-pull cable 43 from the locking action of the lock mechanism 32, and urged to turn into the upturned position under the influence of the biasing action of the gas spring 28.

In this instance, as the entrance gating lever 29 is turned to a hydraulic locking position (C) intermediate between the blocking position (A) and the open position (B), the safety change-over valve is switched to a blocking position by the entrance gating lever 29 to stop supply of pressure oil from the hydraulic pump to the directional control valve and hydraulic actuators.

Further, when in the blocking position (A) as shown in FIG. 2, the entrance gating lever 29 is projected into the passage 9 to block the latter. On the other hand, when in the open position (B) or in the hydraulic locking position (C), the entrance gating lever 29 clears the passage 9.

Indicated at 32 is the lock mechanism which is located between the operator's seat 7 and the console 24. As shown in FIGS. 4 through 9, the lock mechanism 32 is constituted by support pins 34 and 35, slide plate 36, lock pin 41, tension spring 42, and push-pull cable 43, which will be described hereinafter. The lock mechanism 32 functions to lock the console 24 in the operating position, while releasing the console 24 from a locked state in relation with a switching operation by the entrance gating lever 29.

Figure 6:
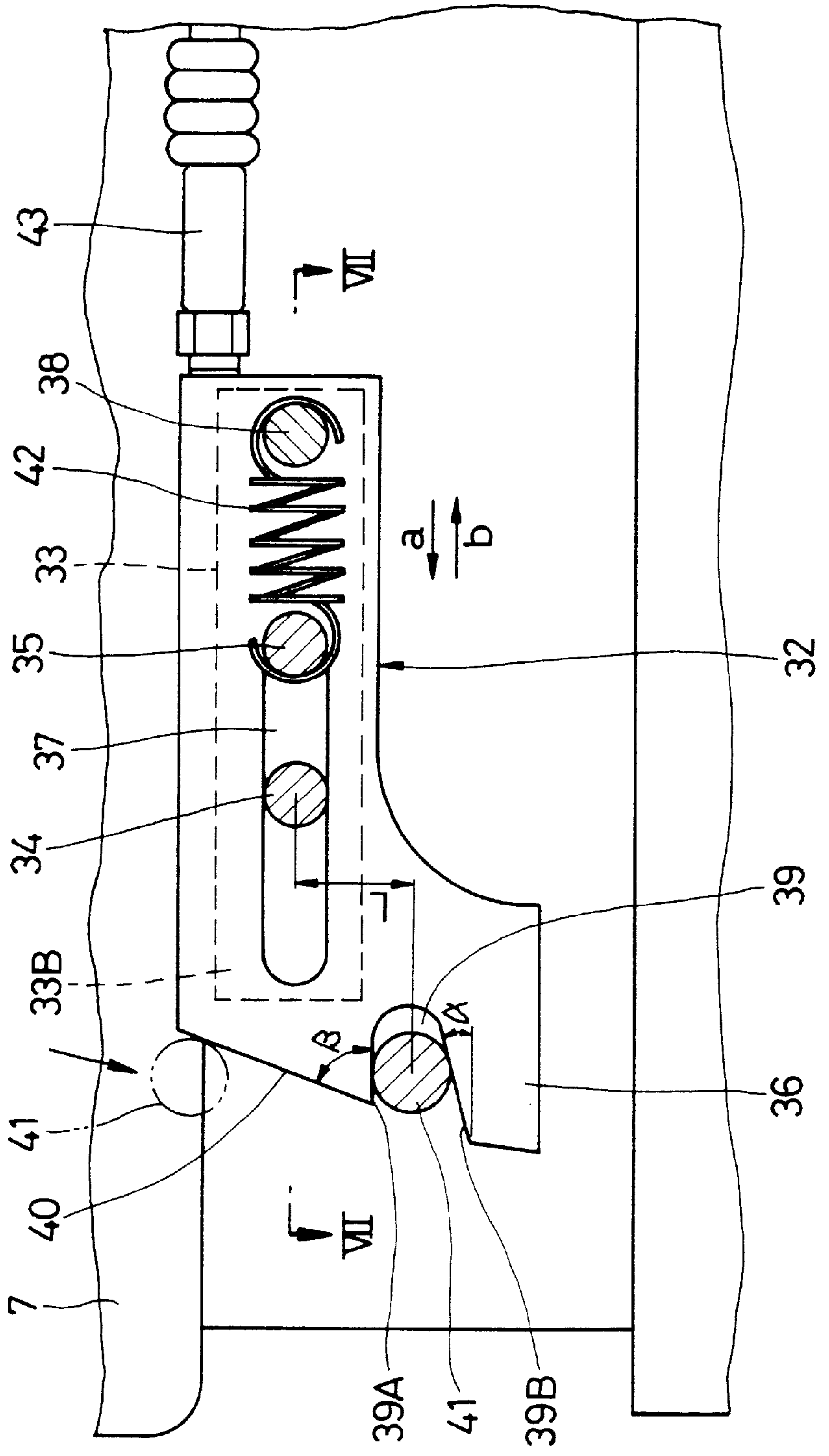
FIG. 6 is an enlarged sectional view of a lock mechanism, taken in the direction of arrows VI—VI in FIG. 4.
Figure 7:
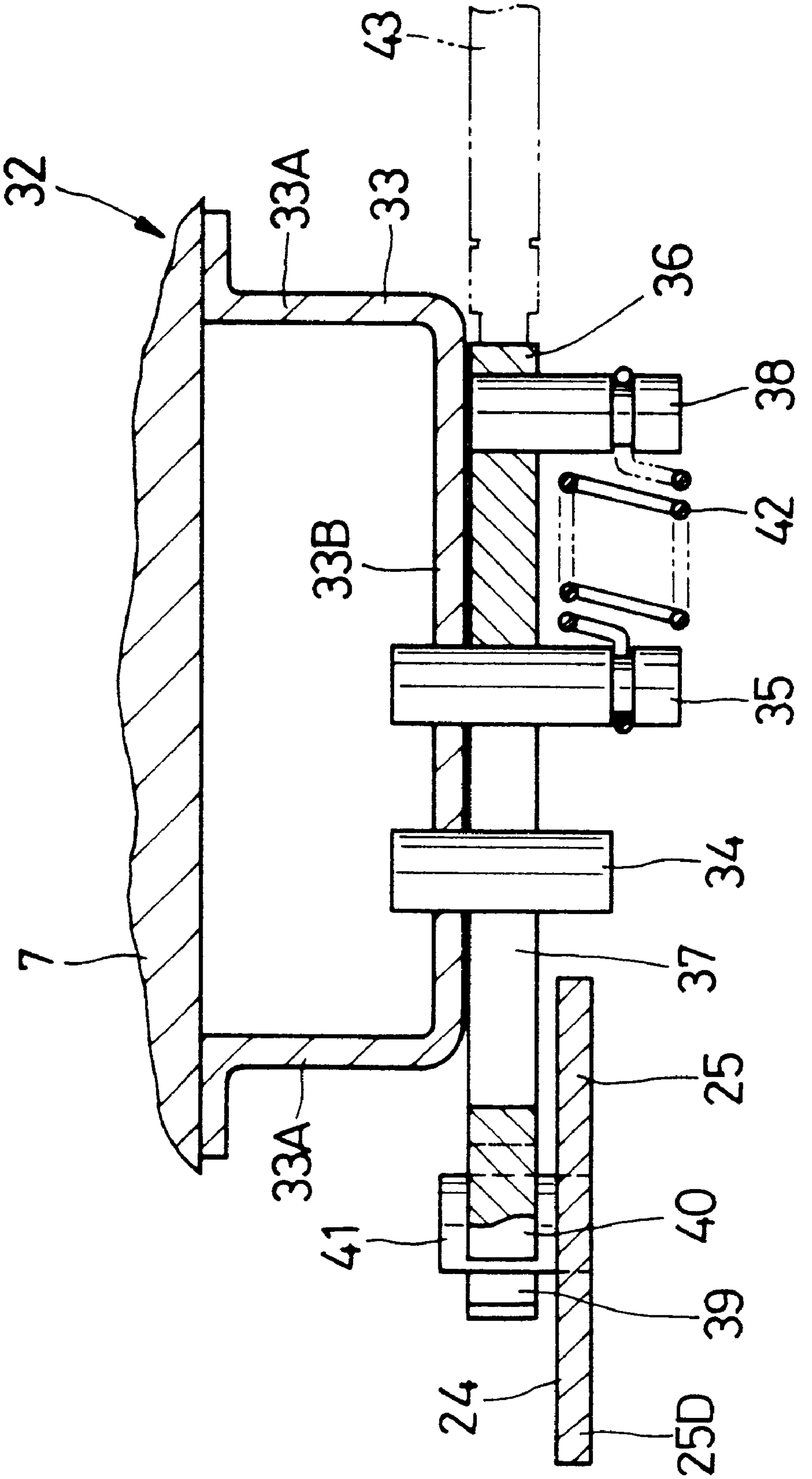
FIG. 7 is a sectional view of the lock mechanism, taken from the direction of arrows VII—VII of FIG. 6.

Denoted at 33 is a bracket substantially of U-shape, which is projected from the left side of the operator's seat 7. As shown in FIGS. 6 and 7, the bracket 33 is constituted by a pair of front and rear legs 33A which are projected on and from the left side of the operator's seat 7, and a guide plate portion 33B which is connected to the front and rear legs 33A at its opposite ends and arranged to guide sliding movements of a slide plate 36.

Indicated at 34 and 35 are support projections, for example, a couple of support pins which are securely fixed to the bracket 33. The support pins 34 and 35 are projected leftward from the guide plate portion 33B of the bracket 33 toward the console 24, and spaced from each other in the longitudinal direction of the guide plate portion 33B. Further, the rear support pin 35 is longer than the front support pin 34, and provided with a spring retainer groove around an outer end portion thereof for engagement with a tension spring 42.

Indicated at 36 is a slide plate which is formed of a metallic material or synthetic resin material to serve as a slide member. As shown in FIG. 6, the slide plate 36 is provided with a slot 37 which is extended in its longitudinal direction, a spring retainer pin 38 which is projected to the left at a position posterior to the slot 37, a notched groove 39, and a tapered surface 40, which will be described hereinafter.

In this instance, the support pins 34 and 35 on the side of the bracket 33 are slidably received in the slot 37. Namely, the slide plate 36 is slidably supported on the two support pins 34 and 35 for sliding movements in the longitudinal direction. The spring retainer pin 38 is provided with a groove in its outer end portion for anchoring a tension spring 42 therein. Further, the a push-pull cable 43 is connected to a rear end portion of the slide plate 36.

When the entrance gating lever 29 is in the blocking position (A), the slide plate 36 is retained in the locking position shown in FIG. 6 under the influence of biasing action of the tension spring 42. On the other hand, when the entrance gating lever 29 is in the open position (B), the slide plate 36 is pulled rearward by the push-pull cable 43 as indicated by arrow b toward an unlocking position shown in FIG. 9.

The notched groove 39 is opened in a fore end portion of the slide plate 36, and substantially in the form of V-groove having a predetermined depth and diverging in the forward direction. Further, the notched groove 39 is so shaped as to provide, on the upper side, a horizontal upper wall section 39A on its upper side and a sloped lower wall section 39B on the lower side, the sloped lower wall section 39B being inclined downward in the forward direction at a predetermined inclination angle a with the horizontal.

Disengageably engaged with the notched groove 39 is the lock pin 41 which is provided on the side of the console 24. In this instance, the notched groove 39 is located such that a center of the lock pin 41 is vertically offset from a center line of the slot 37 (or support pins 34 and 35) by a predetermined distance L.

The tapered surface 40 which is provided at a front end portion of the slide plate 36 is located on the upper side of the opening of the notched groove 39 and inclined downward in the forward direction at a predetermined inclination angle β with the horizontal. As the console 24 is turned toward the operating position from the upturned position, the tapered surface 40 is abutted against the lock pin 41, guiding the latter into the notched groove 39.

Figure 9:
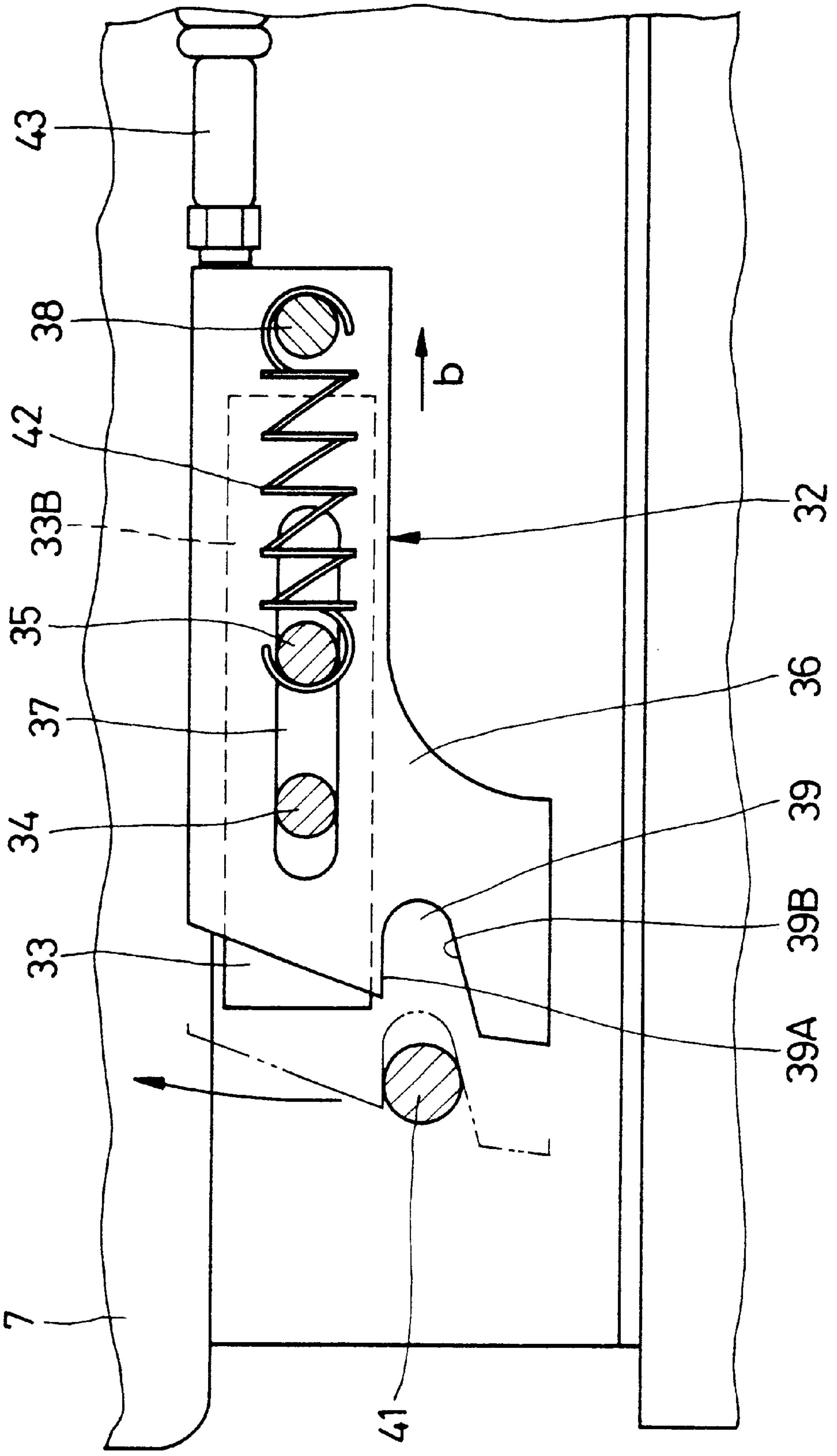
FIG. 9 is an enlarged sectional view of the lock mechanism, showing a slide plate which has been moved from a locking position to an unlocking position.
Figure 10:
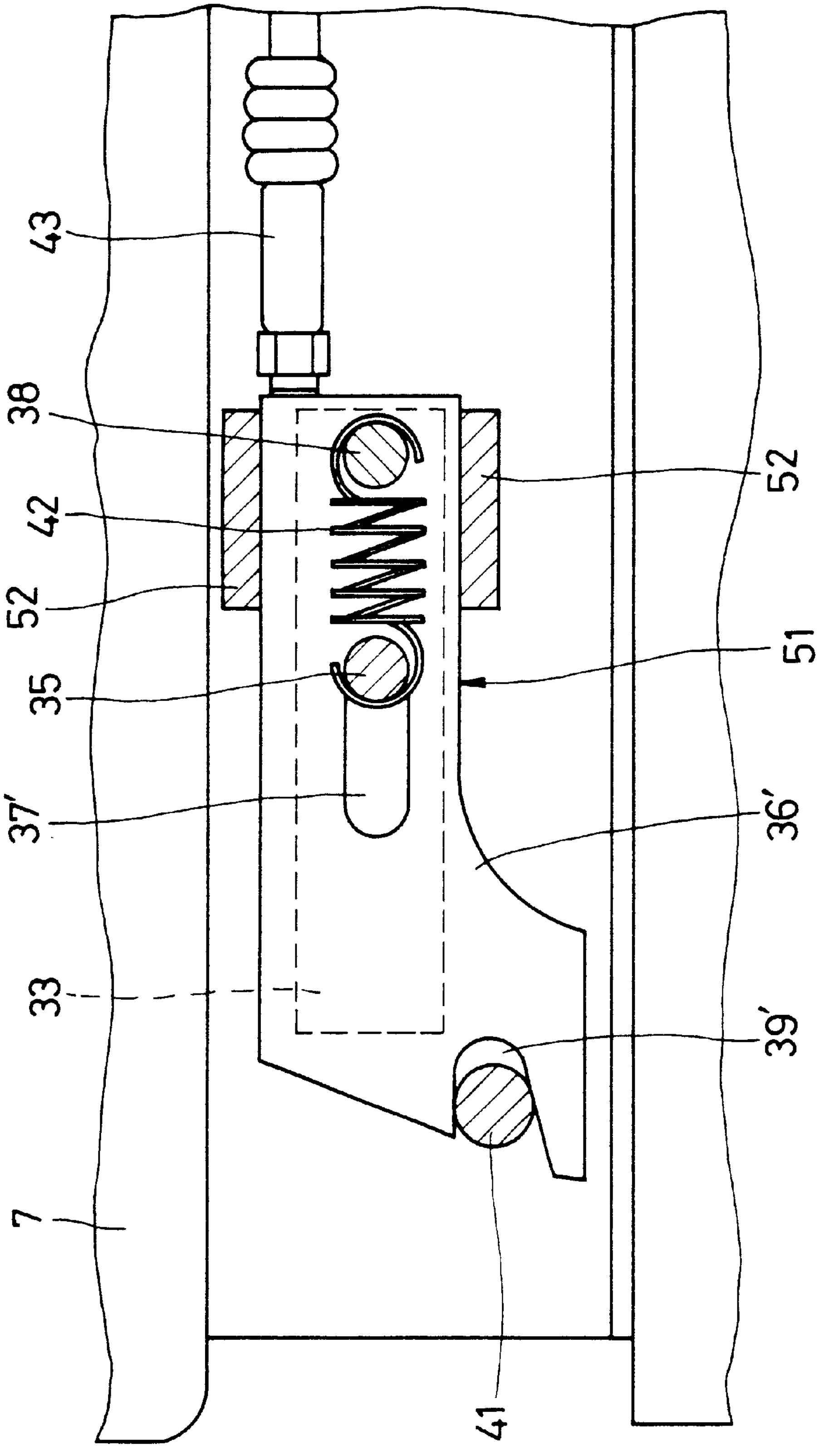
FIG. 10 is an enlarged sectional view of a lock mechanism in a modification according to the present invention.

Denoted at 41 is a lock pin which is fixedly provided on the console 24 to serve as a locking projection. As shown in FIGS. 4 through 9, the lock pin 41 is integrally fixed to the support plate 25D of the frame structure 25 of the console 24, and projected on the right side of the support plate 25D toward the slide plate 35. As shown in FIG. 6, when the console 24 is in the operating position and the slide plate 36 in the locking position, the lock pin 41 is held in engagement with the notched groove 39. On the other hand, when the slide plate 36 is in the unlocking position, the lock pin 41 is disengaged from the notched groove 39 as shown in FIG. 9.

Indicated at 42 is the tension spring which is tensioned between the support pin 35 on the side of the vehicle body and the spring retainer pin 38 of the slide plate 36. By the action of the tension spring 42, the slide plate 36 is constantly biased in the forward direction (in the direction of arrow a) toward the locking position from the unlocking position.

The push-pull cable 43 is connected between the entrance gating lever 39 and the slide plate 36 to serve as a link member. When the entrance gating lever 29 is turned from the blocking position (A) to the open position (B), the slide plate 36 is pulled in the rearward direction (in the direction of arrow b) by the push-pull cable 43 against the biasing action of the tension spring 42 to slide into the unlocking position.

Further, indicated at 44 is a console which is provided on the right side of the operator's seat 7. As shown in FIG. 2, a right operating lever 45 is tiltably provided on the console 44.

With the arrangements as described above, the hydraulic excavator according to the present embodiment is operated in the manner as described below.

Firstly, upon getting onto the cab 4, an operator finds the entrance gating lever 29 in the open position (B) since it was turned into that position at the end of a previous operation, and also finds the console 24 and the operating lever 27 in the respective upturned positions.

In this state, the operator can get to the operator's seat 7 through the entrance opening 8 and the passage 9 in order to start operation of the hydraulic excavator.

Nextly, as the entrance gating lever 29 is turned into the blocking position (A) from the open position (B) by the operator, the safety change-over valve in the hydraulic circuit is switched into a communication position in relation with the movement of the entrance lever 29 through the push-pull cable or signal line, thereby putting hydraulic actuators in an operative state.

In this state, since the entrance gating lever 29 is in the blocking position (A), it blocks the passage 9 to prevent an operator from getting into or getting off the cab. Accordingly, as soon as hydraulic actuators are put in an operative state, the entrance gating lever 29 blocks the passage 9, preventing the operator on the operator's seat 7 from inadvertently getting off the cab 4.

In the next place, the operator pushes the console 24 downward against the action of the gas spring 28. Whereupon, the lock pin 41 which is provided on the console 24 is caused to slide downward along the tapered surface 40 as indicated by an imaginary line in FIG. 6. As a result, the lock pin 41 is smoothly guided toward the notched groove 39 along the tapered surface 40 while putting the slide plate 36 in a sliding movement in the direction of arrow b from the locking position against the action of the tension spring 42.

At this time, since the slide plate 36 is biased toward the locking position under the influence of the action of the tension spring 42 as indicated by arrow a, the lock pin 41 falls into engagement with the notched groove 39 upon reaching the latter, as indicated by solid line in FIG. 6. In this case, the upper and lower wall sections 39A and 39B of the notched groove 39 are diverged away from each other in the forward direction, so that the lock pin 41 is abutted against both the wall sections 39A and 39B and can be held in engagement therewith in a stabilized state.

As a consequence, as shown in FIG. 3, the console 24 is locked in the operating position by the lock mechanism 32, and the operating lever 27 is located in a position beside the left front corner of the operator's seat 7 where the lever 27 can be easily manipulated by the operator.

In this instance, the slot 37 of the slide plate 36 (or the support pins 34 and 35) is offset from the lock pin 41 in the notched groove 39 by a distance L in the vertical direction. Accordingly, reaction force resulting from the use of the gas spring or other parts is exerted on the slide plate 36 from the lock pin 41 as a moment tending to rotate the slide plate 36 about the support pins 34 and 35. Therefore, the slide plate 36 can be abutted against the support pins 34 and 35 and retained in that position by a force acting in an oblique direction relative to the longitudinal direction of the slide plate 36. This means that the slide plate 36 can be supported stably at two different points by the two support pins 34 and 35.

On the other hand, for example, in case the operation of the hydraulic excavator is to be interrupted or stopped, the entrance gating lever 29 is turned to the open position (B) by the operator. Whereupon, the slide plate 36 is pulled in the direction of arrow b in FIG. 9 by the push-pull cable 43 against the action of the tension spring 42 toward unlocking position. As a result, the lock pin 41 is disengaged from the notched groove 39 to release the console 24 from the locked state. In this instance, thanks to the horizontal disposition of the upper wall section 39A, the lock pin 41 can be disengaged from the notched groove 39 smoothly in a horizontal direction.

Consequently, as shown in FIG. 8, under the influence of the biasing action of the gas spring 28, the console 24 is turned into the upturned position along with the lock pin 41.

As the entrance gating lever 29 is turned to the open position (B) from the blocking position (A), it passes the hydraulic locking position (C). At this hydraulic locking position (C), the safety change-over valve is closed to suspend supply of pressure oil to hydraulic actuators, thereby precluding possibilities of the hydraulic actuators being actuated erroneously while the operator is away from the operator's seat 7. As soon the entrance gating lever 29 is put in the open position (B), the passage 9 is opened, permitting the operator to get down from the operator's seat 7 and the cab 4 quite easily.

Thus, according to the present embodiment, for example, the lock mechanism 32 is constituted by two support pins 34 and 35, the slide plate 36 which is slidably supported on the two support pins 34 and 35 and provided with the notched groove 39, the lock pin 41 which is provided on the console 24, and the tension spring 42 which is arranged to urge the notched groove 39 and the lock pin 41 into engagement with each other. Accordingly, when the slide plate 36 is in the locking position, the lock pin 41 on the side of the console 24 can be retained in engagement with the notched groove 39 of the slide plate 36 by the tension spring 42 for locking the console 24 in the operating position.

Further, as soon as the entrance gating lever 29 to slide the slide plate 36 to the unlocking position, the lock pin 41 is disengaged from the notched groove and the console 24 is released from the locked state in the operating position and swung back to the upturned position by the action of the gas spring 28.

Accordingly, the slide plate 36 can be retained in position by the two support pins 34 and 35 in a stabilized state particularly in the vertical direction, and can be smoothly slid in the back and forth directions. As a consequence, as compared with the prior art lock mechanism using a rotary hook, it becomes possible to more effectively prevent vertical staggering movements which would otherwise occur to the slide plate 36 along with the console 24 (or the lock pin 41) conspicuously when in vibrated conditions. This also contributes to suppress generation of noises and to prevent performance errors of the lock mechanism 32.

In the particular embodiment shown, for example, two support pins 34 and 35 are located in longitudinally spaced positions, and the slide plate 36 is slidably supported on the two support pins 34 and 35 through the slot 37. This arrangement makes it possible to set the slide plate 36 easily in position in the vertical direction, and to determine the stroke length of its sliding movements by simple construction.

Besides, the slide plate 36 is provided with the slot 37 and the notched groove 39 which are offset from each other by a distance L in the vertical direction, so that, even if an external force is applied from the lock pin 41 to the slide plate due to the gas spring 28, for example, it will act as a moment tending to turn the slide plate 36 about the two support pins 34 and 35. It follows that the slide plate 36 can be stably supported at two points by the two support pins 34 and 35.

On the other hand, the slide plate 36 is provided with the notched groove 39 which is formed by substantially horizontal upper wall section 39A and lower wall section 39B which is sloped downward in the forward direction. Accordingly, the lock pin 41 can be retained stably within the notched groove 39 in abutting engagement with the upper and lower wall sections 39A and 39B.

Further, since the upper wall section 39A of the notched groove 39 is disposed substantially in the horizontal direction, the lock pin 41 can be moved smoothly in the horizontal direction in sliding contact with the upper wall section 39A when it is disengaged from the notched groove 39 by a horizontal sliding movement of the slide plate 36. Accordingly, the console 24 can be unlocked in an easy and smooth manner.

Further, the slide plate 36 is provided with the tapered surface 40 along its upper end on the upper side of the notched groove 39, so that, at the time of locking the console 24 in the operating position, the lock pin 41 can be guided smoothly toward and into the notched groove 39 by the tapered surface 40. Thus, the console 24 can be locked in the operating position by a smooth locking action.

In the above-described embodiment, by way of example the lock mechanism employs two support pins 34 and 35 to support the slide plate 36 through the slot 37. However, it is to be understood that the present invention is not limited to this particular arrangement. For instance, as in the case of a modification shown in FIG. 10, a slide plate 36' may be supported by a single support pin 35 and a pair of upper and lower support rails 52.

Namely, in this case, a lock mechanism 51 is constituted by a pair of support rails 52 which are extended in the longitudinal direction along upper and lower sides of a slide plate 36' and projected from the operator's seat 7 toward the console 24 as a pair of support projections. The slide plate 36' is provided with a slot 37' and a notched groove 39' in the same manner as in the foregoing embodiment, and supported by the support pin 35 and the upper and lower support rails 52 slidably in the longitudinal direction.

Further, for the purpose of supporting the slide plate 36, by way of example two support pins 34 and 35 are provided on the bracket 33 in the foregoing embodiment. However, the present invention is not limited to the particular arrangement shown. For example, three or more support pins may be provided on the bracket for supporting the slide plate.

Furthermore, in the foregoing embodiment, the present invention is applied to a hydraulic excavator having the operator's seat 7 within the cab 4. However, the present invention can be applied to hydraulic excavators of other types, for example, to small-size hydraulic excavators having a canopy over an operator's seat instead of a cab or to ultra small-size excavators which are not equipped with even a canopy.

Further, the present invention is applied by way of example to a hydraulic excavator in the foregoing embodiment. However, the present invention can be similarly applied to other construction machines such as hydraulic cranes, wheel loaders and the like.

INDUSTRIAL APPLICABILITY

As described in detail hereinbefore, according to the present invention, a lock mechanism is constituted by support projections provided on the side of an operator's seat, a slide member slidably supported on the support projections for back and forth sliding movements and provided with a notched groove, a lock pin provided on the side of a console and adapted to be brought into and out of engagement with the notched groove in relation with back and forth sliding movements of the slide plate between a locking position and an unlocking position, a spring member urging the slide plate into engagement with the notched groove, and a link member connected between the slide member and a entrance gating lever to put the slide member in a sliding movement in relation with manipulation of the entrance gating lever. The slide member can be supported stably in position in the vertical direction by the support projections in such a way as to prevent vibrational vertical staggering movements of the slide member while permitting to lock the console in an operating position in a stable state. In addition, in relation with manipulation of the entrance gating lever, the slide member can be smoothly put in a forward or rearward sliding movement, releasing the console from the lock mechanism and permitting same to turn into an upturned position by the biasing member. Accordingly, the above arrangements contribute to suppress generation of noises by and malfunctioning of the lock mechanism while the construction machine is in operation.

Further, according to the present invention, the notched groove is formed substantially in V-shape, so that the locking projection can be retained stably in the notched groove in abutting engagement with opposite wall sections of the notched groove, free of vertical staggering movements within the notched groove.

Furthermore, according to the present invention, the notched groove is defined by a horizontal upper wall section and a sloped lower wall section which is inclined downward toward a fore open end of the notched groove. Therefore, the locking projection can be stably retained in the notched groove in abutting engagement with the upper and lower wall sections, free of vertical staggering movements within the notched groove. Upon sliding the slide member in a forward or rearward direction, the locking projection can be disengaged from the notched groove smoothly in a forward or rearward direction, and therefore the console can be unlocked in a facilitated manner.

Further, according to the present invention, the slide member is provided with a tapered or sloped surface along a fore end portion thereof for guiding the locking projection toward and into the notched groove. Therefore, at the time of locking the console in the operating position, the locking projection can be smoothly guided toward the notched groove along the tapered surface, and the console can be locked in the operating position by a smooth locking action.

Furthermore, according to the present invention, the locking projections are slidably received in a slot which is formed in the slide member in a longitudinal direction thereof and in a vertically offset position from the notched groove. Therefore, the slide member can be stably supported in position in the vertical direction by the support projections. Besides, since the slot and the notched groove are located in vertically offset positions, an external force acts on the slide member as a moment tending to turn the slide member about the support projections and holding the slide member in abutment against the support projections in a stabilized state. Accordingly, the slide member can be supported on the support projections despite external forces which may be exerted thereto.

Further, according to the present invention, a plural number of support projections are provided in spaced positions in the longitudinal direction of the slide member. Therefore, the slide member can be supported by the support projections stably at a plural number of points and at a predetermined position in the vertical direction.

What is claimed is:

1. A construction machine including a vehicle body having an operator's seat and an entrance opening providing an access to said operator's seat, and a console device to be operated by an operator who is seated on said operator's seat, said console device including a console vertically swingably supported on said vehicle body in a position at one side of said operator's seat and provided with an operating lever to be manipulated by said operator, a biasing member urging said console from an operating position to an upturned rest position, an entrance gating lever pivotally supported at one side of said console and pivotally switchable to and from a blocking position and an open position, and a lock mechanism for releasably locking said console to the side of said vehicle body, said lock mechanism being arranged to be shifted to an unlocking position by said entrance gating lever, releasing said console into an unlocked state from a locking position holding said console in said operating position, characterized in that said lock mechanism of said console device comprises:

support projections provided on the side of said operator's seat and projected toward said console;

a slide member supported by said support projections for back and forth sliding movements and provided with a notched groove at a fore end portion thereof;

a locking projection provided on the side of said console and adapted to be brought into engagement with said notched groove when said slide member is shifted forward into said locking position and disengaged from said notched groove when said slide member is shifted rearward into said unlocking position;

a biasing spring member provided between said vehicle body and said slide member and arranged to urge said slide member in a direction for engagement with said notched groove; and a link member connected between said entrance gating lever and said slide member and adapted to slide said slide member in a rearward direction against said biasing spring in relation with manipulation of said entrance gating lever.

2. A construction machine as defined in claim 1, wherein said notched groove is formed substantially in V-shape diverging toward an outer open end thereof.

3. A construction machine as defined in claim 1, wherein said notched groove is defined in said slide member by a substantially horizontal upper wall section, and a sloped lower wall section inclined downward in forward direction.

4. A construction machine as defined in claim 1, wherein said notched groove is formed substantially in V-shape diverging toward an outer open end thereof, said notched groove of V-shape being defined in said slide member by a substantially horizontal upper wall section and a sloped lower wall section inclined downward in forward direction.

5. A construction machine as defined in claim 1, wherein said slide member is provided with a tapered surface along a fore end portion on the upper side of said notched groove for guiding said locking projection toward and into said notched groove.

6. A construction machine as defined in claim 1, wherein said notched groove is formed in V-shape diverging toward an outer open end, and said slide member is provided with a tapered surface along a fore end portion on the upper side of said notched groove thereby to guide said locking projection toward and into said notched groove.

7. A construction machine as defined in claim 1, wherein said notched groove is defined in said slide member by a substantially horizontal upper wall section and a sloped lower wall section inclined downward in forward direction, and said slide member is provided with a tapered surface along a fore end portion on the upper side of said notched groove thereby to guide said locking projection toward and into said notched groove.

8. A construction machine as defined in claim 1, wherein said slide member is provided with a slot extending substantially horizontally in a longitudinal direction thereof and in a position vertically offset from said notched groove by a predetermined distance, and said support projections are slidably received in said slot for sliding movements thereaong.

9. A construction machine as defined in claim 1, wherein a plural number of support projections are provided at one side of said operator's seat at intervals in horizontal direction.

* * * * *